US011587256B2

(12) United States Patent
Park et al.

(10) Patent No.: US 11,587,256 B2
(45) Date of Patent: Feb. 21, 2023

(54) APPARATUS FOR AUTONOMOUS DRIVING AND METHOD AND SYSTEM FOR CALIBRATING SENSOR THEREOF

(71) Applicant: Electronics and Telecommunications Research Institute, Daejeon (KR)

(72) Inventors: Jae Hyuck Park, Daejeon (KR); Yong Woo Jo, Daejeon (KR); Doo Seop Choi, Sejong-si (KR); Kyoung Wook Min, Sejong-si (KR); Jeong Dan Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 322 days.

(21) Appl. No.: 17/110,853

(22) Filed: Dec. 3, 2020

(65) Prior Publication Data
US 2021/0174547 A1 Jun. 10, 2021

(30) Foreign Application Priority Data
Dec. 5, 2019 (KR) .................. 10-2019-0161093

(51) Int. Cl.
*G06T 7/80* (2017.01)
*G08G 5/00* (2006.01)
*B64C 39/02* (2006.01)

(52) U.S. Cl.
CPC .............. *G06T 7/80* (2017.01); *B64C 39/024* (2013.01); *G08G 5/003* (2013.01); *G08G 5/0069* (2013.01);
(Continued)

(58) Field of Classification Search
CPC ............ G06T 7/80; G06T 2207/30208; G06T 2207/30252; B64C 39/024;
(Continued)

(56) References Cited

U.S. PATENT DOCUMENTS
9,275,458 B2 3/2016 Oh et al.
10,853,942 B1 * 12/2020 Boyd ..................... G06V 20/17
(Continued)

FOREIGN PATENT DOCUMENTS
KR 1020150077081 A 7/2015
KR 101695248 B1 1/2017
(Continued)

*Primary Examiner* — Michael E Teitelbaum
(74) *Attorney, Agent, or Firm* — William Park & Associates Ltd.

(57) ABSTRACT

The autonomous driving device including a communication circuit configured to communicate with an unmanned aerial vehicle, a plurality of sensors disposed in the autonomous vehicle to monitor all directions of the autonomous vehicle, and a processor, wherein the processor is configured to: control the unmanned aerial vehicle to hover at each of a plurality of waypoints of a designated flight path by controlling a relative position of the unmanned aerial vehicle through the communication circuit, change a posture angle of the unmanned aerial vehicle to a plurality of posture angles corresponding to the waypoints of the flight path, generate a plurality of images including the checkerboard and corresponding to the plurality of waypoints and the plurality of posture angles through the plurality of sensors, and calibrate the plurality of sensors on the basis of a relationship between matching points of the plurality of images.

20 Claims, 4 Drawing Sheets

(52) U.S. Cl.
CPC .... *B64C 2201/12* (2013.01); *B64C 2201/145* (2013.01); *B64C 2201/146* (2013.01); *G06T 2207/30208* (2013.01); *G06T 2207/30252* (2013.01)

(58) Field of Classification Search
CPC .......... B64C 2201/12; B64C 2201/145; B64C 2201/146; B64C 2201/027; G08G 5/003; G08G 5/0069; G08G 5/0013; G08G 5/0034; G06V 20/56; B60W 2050/0005; B60W 40/02; B60W 30/14; B60W 60/001; B60W 2050/0083; B60W 2420/42; B60W 2420/52; B60W 2556/45; B60R 21/0134; B64D 45/00; B60Y 2400/30

See application file for complete search history.

(56) References Cited

U.S. PATENT DOCUMENTS

| | | | | |
|---|---|---|---|---|
| 2016/0245899 | A1* | 8/2016 | Rybski | G05D 1/102 |
| 2018/0005534 | A1* | 1/2018 | Jesudason | G08G 5/0069 |
| 2019/0172225 | A1 | 6/2019 | Park et al. | |
| 2020/0391704 | A1* | 12/2020 | Arunmozhi | G06T 7/80 |

FOREIGN PATENT DOCUMENTS

| | | |
|---|---|---|
| KR | 1020180029638 A | 3/2018 |
| KR | 102021202 B1 | 9/2019 |
| WO | 2019133231 A1 | 7/2019 |

* cited by examiner

APPARATUS FOR AUTONOMOUS DRIVING AND METHOD AND SYSTEM FOR CALIBRATING SENSOR THEREOF

CROSS-REFERENCE TO RELATED APPLICATION

This application claims priority to and the benefit of Korean Patent Application No. 10-2019-0161093, filed on Dec. 5, 2019, the disclosure of which is incorporated herein by reference in its entirety.

BACKGROUND

1. Field of the Invention

Various embodiments disclosed herein relate to a vehicle sensor calibration technique.

2. Discussion of Related Art

Autonomous vehicles may be equipped with multiple sensors (e.g., a camera, a lidar, and a radar) to detect objects around the vehicles. In order for autonomous vehicles to accurately detect distances to surrounding objects, these sensors should be calibrated. Therefore, autonomous vehicles can perform intrinsic calibration and extrinsic calibrations on sensors that are initially installed (e.g., during production). The intrinsic calibration is to check internal parameters of a sensor itself or to compensate for distortions thereof, and the extrinsic calibration may be to confirm a correlation between a coordinate system that is focused on a sensor and a reference coordinate system that depends on a vehicle.

As one sensor calibration scheme for an autonomous vehicle, a person can obtain output values of sensors while holding a checkerboard (e.g., a plaid plate) and turning around a stopped vehicle. For the autonomous vehicle, a parameter for calibration may be calculated using a matching point between the obtained output values of the sensors or using a physical size of the checkerboard.

As another sensor calibration scheme for an autonomous vehicle, the vehicle is stopped in an indoor space including a calibration pattern so that output values of sensors may be obtained. Then, the parameter may be calculated using a matching point between the output values and a physical size of the calibration pattern.

SUMMARY OF THE INVENTION

However, one sensor calibration scheme may take a lot of time and may be difficult to perform alone because this scheme requires that a plurality of output values are acquired while a checkerboard (a plate marked with a grid pattern) is placed at various inclinations throughout a visible range of a vehicle sensor for the purpose of accurate calibration. Also, another sensor calibration scheme has a spatial limitation because this scheme requires a separate indoor space for calibration.

Meanwhile, the position and posture of a sensor fixed to an autonomous vehicle may change over time due to the dynamic vehicle characteristics and the physical characteristics of a sensor fixing device. Therefore, sensors need to be calibrated on a regular basis.

Various embodiments disclosed herein may provide an autonomous driving device and a sensor calibration system and method that are capable of easily calibrating sensors of an autonomous vehicle.

According to an aspect of the present invention, there is provided an autonomous driving device included in an autonomous vehicle, the autonomous driving device including a communication circuit configured to communicate with an unmanned aerial vehicle to which a checkerboard is fixed, a plurality of sensors disposed in the autonomous vehicle to monitor all directions of the autonomous vehicle, and a processor, wherein the processor is configured to control the unmanned aerial vehicle to hover at each of a plurality of waypoints of a designated flight path by controlling a relative position of the unmanned aerial vehicle through the communication circuit, change a posture angle of the unmanned aerial vehicle to a plurality of posture angles corresponding to the waypoints of the flight path, generate a plurality of images including the checkerboard and corresponding to the plurality of waypoints and the plurality of posture angles through the plurality of sensors, and calibrate the plurality of sensors on the basis of a relationship between matching points of the plurality of images.

According to another aspect of the present invention, there is provided a sensor calibration system including an unmanned aerial vehicle to which a checkerboard is fixed; and an autonomous driving device configured to control the unmanned aerial vehicle and included in an autonomous vehicle, wherein the autonomous driving device is configured to: control the unmanned aerial vehicle to hover at each of a plurality of waypoints of a designated flight path by controlling a relative position of the unmanned aerial vehicle, change a posture angle of the unmanned aerial vehicle to a plurality of posture angles corresponding to the waypoints of the flight path, generate a plurality of images including the checkerboard and corresponding to the plurality of waypoints and the plurality of posture angles through a plurality of sensors, and calibrate the plurality of sensors on the basis of a relationship between matching points of the plurality of images.

According to another aspect of the present invention, there is provided a sensor calibration method performed by an autonomous driving device, the sensor calibration method including controlling an unmanned aerial vehicle, to which a checkerboard is fixed, to hover at each of a plurality of waypoints of a designated flight path, changing a posture angle of the unmanned aerial vehicle to a plurality of posture angles corresponding to the waypoints of the flight path; generating a plurality of images including the checkerboard and corresponding to the plurality of waypoints and the plurality of posture angles through a plurality of sensors included in the autonomous driving device; and calibrating the plurality of sensors on the basis of a relationship between matching points of the plurality of images.

BRIEF DESCRIPTION OF THE DRAWINGS

In describing the drawings, the same or similar reference numerals may be used to designate the same or similar elements.

DETAILED DESCRIPTION OF EXEMPLARY EMBODIMENTS

Figure 1:
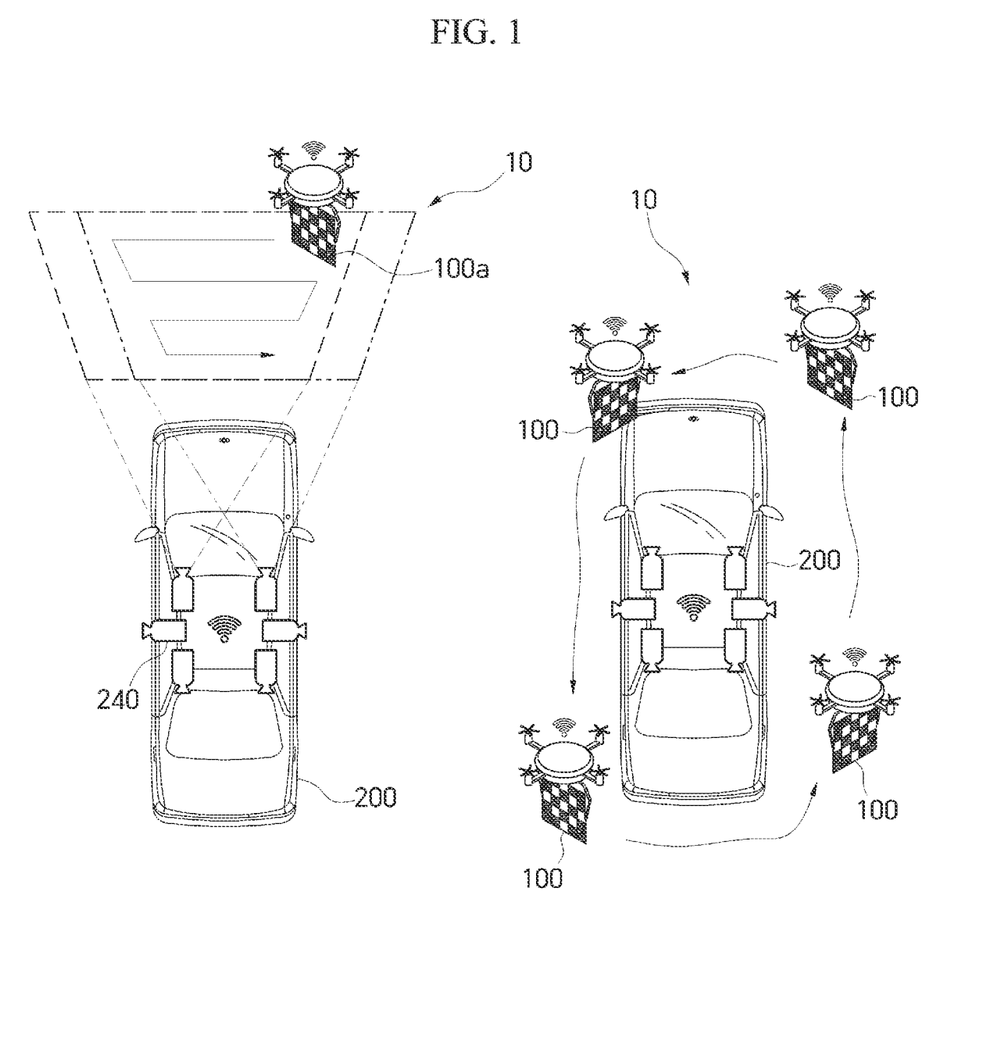
FIG. 1 shows a sensor calibration system according to an embodiment.

FIG. 1 shows a sensor calibration system 10 according to an embodiment.

Referring to FIG. 1, the sensor calibration system 10 according to an embodiment may include an unmanned aerial vehicle 100 and an autonomous driving device 200.

According to an embodiment, the unmanned aerial vehicle 100 may fix a checkerboard 100a and change the position coordinates of the unmanned aerial vehicle 100 and the roll, pitch, and yaw angle of the unmanned aerial vehicle 100.

According to an embodiment, the unmanned aerial vehicle 100 may be fixed or mounted in an area of an autonomous vehicle (e.g., its own trunk area) and may start flight according to a command of the autonomous driving device 200. Also, the unmanned aerial vehicle 100 may change a flight state, which is at least one of a flight position or a posture angle, according to a command of the autonomous driving device 200. For example, the unmanned aerial vehicle 100 rotates the angle of the body while moving to position coordinates corresponding to a command of the autonomous driving device 200 included in the autonomous vehicle. Thus, the distance and angle of the checkerboard 100a (or the unmanned aerial vehicle 100) may be adjusted based on the autonomous driving device 200.

According to an embodiment, the autonomous driving device 200 may include a plurality of sensors 240 mounted on the autonomous vehicle to detect surrounding objects. The autonomous driving device 200 may detect the checkerboard 100a of the unmanned aerial vehicle 100 through the plurality of sensors 240. For example, the autonomous driving device 200 may transmit a command for adjusting the distance and angle of the checkerboard 100a to the unmanned aerial vehicle 100 and may acquire a value detected for the checkerboard 100a (or images including the checkerboard 100a) at the adjusted distance and angle through the plurality of sensors 240. The autonomous driving device 200 may calibrate the plurality of sensors 240 on the basis of the acquired detected value.

According to the above-described embodiment, the sensor calibration system 10 may perform vehicle sensor calibration using the unmanned aerial vehicle 100 fixing the checkerboard 100a, and thus it is possible to improve the spatial constraint of the sensor calibration and calibrate the vehicle sensors while easily and accurately positioning the checkerboard 100a.

Figure 2:
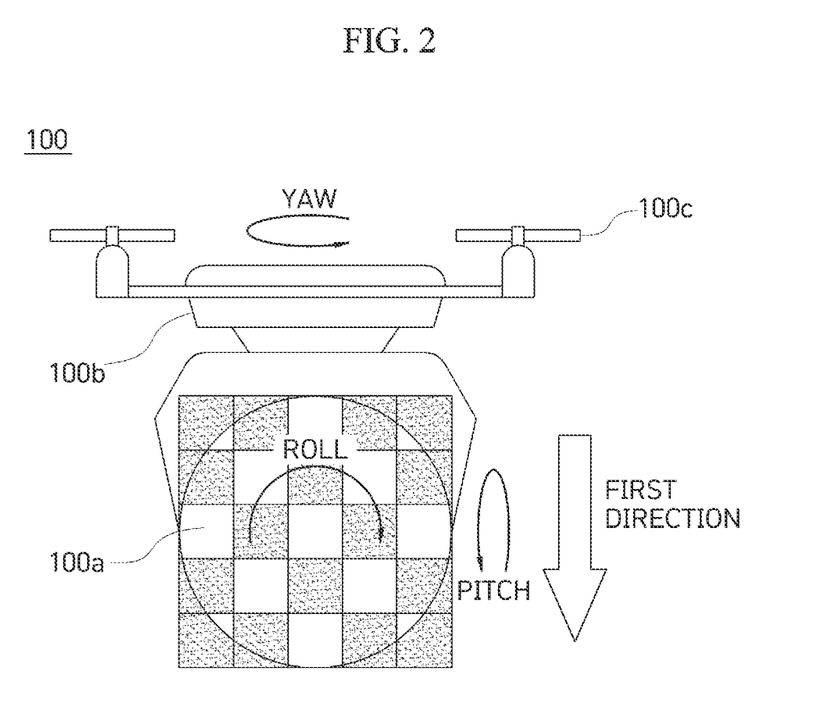
FIG. 2 shows an external view of an unmanned aerial vehicle according to an embodiment.

FIG. 2 shows an external view of an unmanned aerial vehicle according to an embodiment.

Referring to FIG. 2, the unmanned aerial vehicle 100 according to an embodiment may fix the checkerboard 100a to a lower portion of a body 100b, i.e., in a first direction of the body 100b, and may rotate the checkerboard 100a by changing the roll, pitch, and yaw angle of the body 100b. A plurality of propellers 100c are included in an upper portion of the body 100b, and the unmanned aerial vehicle 100 may adjust a posture angle or a flight direction by adjusting whether the plurality of propellers 100c rotate and the number of rotations.

Figure 3:
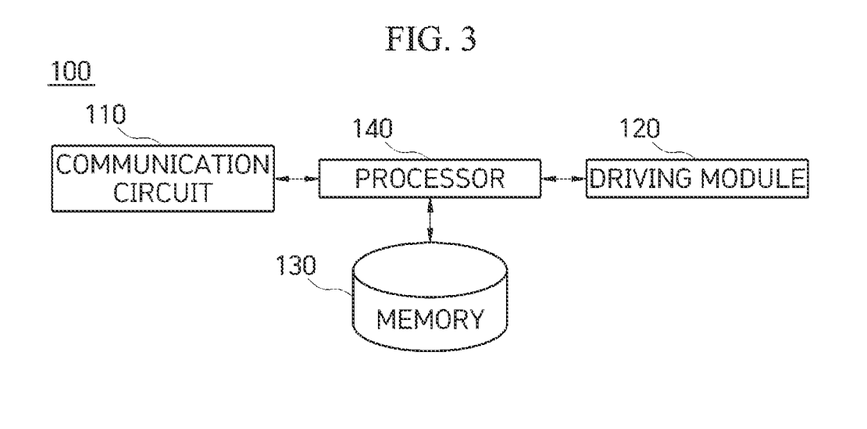
FIG. 3 shows a configuration diagram of an unmanned aerial vehicle according to an embodiment.

FIG. 3 shows a configuration diagram of an unmanned aerial vehicle according to an embodiment.

Referring to FIG. 3, the unmanned aerial vehicle 100 according to an embodiment may include a communication circuit 110, a driving module 120, a memory 130, and a processor 140. In an embodiment, some elements of the unmanned aerial vehicle 100 may be omitted, or the unmanned aerial vehicle 100 may further include an additional element. Also, some of the elements of the unmanned aerial vehicle 100 are combined into a single entity, and the functions of the corresponding elements before the combination may be performed in the same manner.

The communication circuit 110 may establish a wired or wireless communication channel between the unmanned aerial vehicle 100 and other devices (e.g., the autonomous driving device 200) and support communication performed through the established communication channel. The communication channel may include a wireless communication channel such as Wi-Fi, Mobile Worldwide Interoperability for Microwave Access (M-WiMAX), and Bluetooth.

The driving module 120 may include a plurality of propellers (e.g., a plurality of propellers 100c in FIG. 2) and a plurality of motors for rotating the plurality of propellers 100c. The driving module 120 may fly the unmanned aerial vehicle 100 and control the posture angle of the unmanned aerial vehicle 100 by adjusting whether the motors connected to the plurality of propellers rotate and the number of rotations according to a command of the processor 140.

The memory 130 may store various types of data used by at least one element (e.g., the processor 140) of the unmanned aerial vehicle 100. The data may include, for example, input data or output data for software and relevant commands. For example, the memory 130 may store at least one instruction for adjusting whether the unmanned aerial vehicle flies and adjusting a posture angle. The memory 130 may include a volatile memory or a nonvolatile memory.

By executing at least one instruction, the processor 140 may control at least one other element (e.g., a hardware or software element) of the unmanned aerial vehicle 100 and may perform various data processing or operations. For example, the processor 140 may include at least one of a central processing unit (CPU), a graphics processing unit (GPU), a microprocessor, an application processor, an application-specific integrated circuit (ASIC), and a field-programmable gate array (FPGA) and may have a plurality of cores.

According to an embodiment, the processor 140 may acquire a command related to the driving of the unmanned aerial vehicle 100 from the autonomous driving device 200 through the communication circuit 110 and may control a flight start, a flight position, and a posture angle by controlling the body of the unmanned aerial vehicle 100 according to the acquired command. For example, when a flight state change command is acquired from the autonomous driving device 200, the processor 140 may change the flight position and the posture angle according to the acquired flight state change command. When a flight state holding command is acquired from the autonomous driving device 200, the processor 140 may allow the unmanned aerial vehicle 100 to hover at the current position according to the vehicle status holding command. According to various embodiments, the processor 140 may change a flight state according to an acquired command and then transmit a flight vehicle reporting information for reporting the completion of a change in flight state to the autonomous driving device 200. Also, the processor 140 may transmit flight state reporting information for reporting a hovering flight to the autonomous driving device 200 while the unmanned aerial vehicle 100 is hovering according to the flight state holding command.

According to various embodiments, the unmanned aerial vehicle 100 may further include a Global Positioning System (GPS) module (not shown) configured to acquire the position coordinates of the unmanned aerial vehicle 100 in communication with GPS satellites. In this case, the unmanned aerial vehicle 100 may generate position coordinate information on the basis of a GPS module (not shown) and transmit the position coordinate information to the autonomous driving device 200. Alternatively, the unmanned aerial vehicle 100 may acquire a flight state change command including a posture angle and a flight position to be changed from the autonomous driving device 200 and change a flight state according to the acquired command.

According to the above-described embodiment, the unmanned aerial vehicle 100 may easily change the angle of the checkerboard 100a based on the autonomous vehicle according to a command of the autonomous driving device 200, thereby greatly improving the convenience of calibration of a vehicle sensor.

Figure 4:
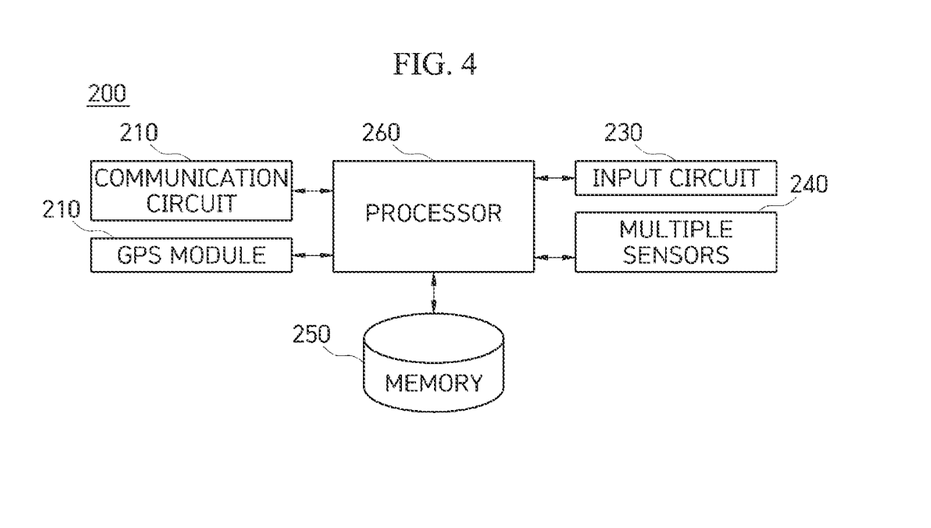
FIG. 4 shows a configuration diagram of a sensor calibration system according to an embodiment.
Figure 5:
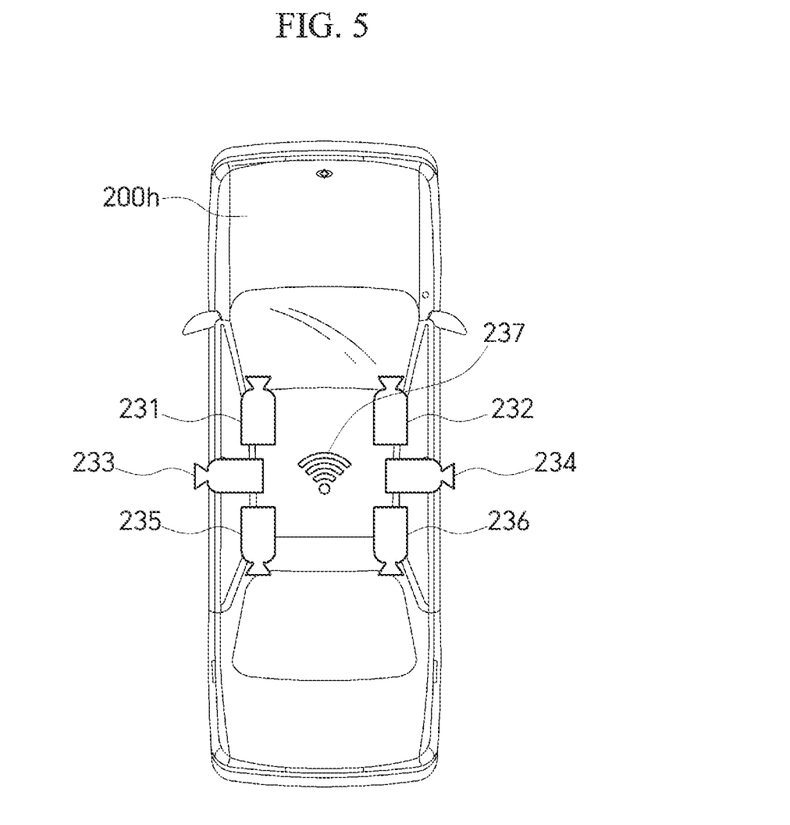
FIG. 5 shows a plurality of sensors included in a sensor calibration system according to an embodiment.

FIG. 4 shows a configuration diagram of a sensor calibration system according to an embodiment, and FIG. 5 shows a plurality of sensors included in a sensor calibration system according to an embodiment.

Referring to FIG. 4, the autonomous driving device 200 according to an embodiment may include a communication circuit 210, a GPS module 220, a plurality of sensors 240, an input circuit 230, a memory 250, and a processor 260. In an embodiment, some elements of the autonomous driving device 200 may be omitted, or the autonomous driving device 200 may further include an additional element. Also, some of the elements of the autonomous driving device 200 are combined into a single entity, and the functions of the corresponding elements before the combination may be performed in the same manner.

The communication circuit 210 may establish a wired or wireless communication channel between the autonomous driving device 200 and other devices (e.g., the unmanned aerial vehicle 100) and support communication performed through the established communication channel. The communication channel may include a wireless communication channel such as Wi-Fi, M-WiMAX, and Bluetooth.

The GPS module 220 may acquire position coordinate information of the autonomous driving device 200 (or the autonomous vehicle) in communication with GPS satellites. The position coordinate information may be, for example, position coordinate information corresponding to the reference coordinate system (e.g., the Earth-centered fixed coordinate system).

The input circuit 230 may detect or receive a user input. The input circuit 230 may include an input circuit, which is at least one of a physical button and a touch button.

The plurality of sensors 240 may detect an object near the autonomous vehicle. The plurality of sensors 240 may include a plurality of cameras 231 to 236 and a lidar 237. Referring to FIG. 5, the plurality of cameras 231 to 236 may include a first camera 231 and a second camera 232 capable of capturing images in front of an autonomous vehicle 200h, a third camera 233 and a fourth camera 234 capable of capturing images to the left and right of the autonomous vehicle 200h, and a fifth camera 235 and a sixth camera 236 capable of capturing images behind the autonomous vehicle 200h. The plurality of cameras 231 to 236 may generate a plurality of orientation images by capturing respective visible ranges. The lidar 237 may be positioned above and at the center of the body of the autonomous vehicle 200h to monitor all directions of the autonomous vehicle 200h and may generate an omnidirectional image including an intensity value for a detection region. The plurality of orientation images and the omnidirectional image may be referred to as a plurality of images.

The memory 250 may include a volatile memory or a nonvolatile memory. The memory 250 may store various types of data used by at least one element (e.g., the processor 260) of the autonomous driving device 200. The data may include, for example, input data or output data for software and relevant commands. For example, the memory 250 may store at least one instruction for vehicle sensor calibration. As another example, the memory 250 may store placement position information and visible-range information of the plurality of sensors 240.

By executing at least one instruction, the processor 260 may control at least one other element (e.g., a hardware or software element) of the autonomous driving device 200 and may perform various data processing or operations. For example, the processor 260 may include at least one of a CPU, a GPU, a microprocessor, an application processor, an ASIC, and an FPGA and may have a plurality of cores.

According to an embodiment, when the position coordinates of the surrounding object are acquired from each of the plurality of sensors 240, the processor 260 may convert the acquired position coordinates into position coordinates (X, Y, Z) corresponding to the reference coordinate system. For example, the processor 260 may convert position coordinates (x, y) acquired by the sensors 240 into a coordinate value of the reference coordinate system by multiplying the position coordinates (x, y) acquired from each of the sensors 240 as expressed in Equation 1 by an intrinsic parameter and an extrinsic parameter of the corresponding sensor.

$$s \begin{bmatrix} x \\ y \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix} \quad \text{[Equation 1]}$$

$$\text{Intrinsic Parameter} = \begin{bmatrix} f_x & 0 & c_x \\ 0 & f_y & c_y \\ 0 & 0 & 1 \end{bmatrix}$$

$$\text{Extrinsic Parameter} = \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix}$$

According to an embodiment, when a sensor calibration request is acquired through the input circuit 230, the processor 260 may calibrate the plurality of sensors using the checkerboard 100a of the unmanned aerial vehicle 100 in the same manner as operations described below according to the acquired calibration request. As a result, the processor 260 may update the intrinsic parameter and the extrinsic parameter of each sensor 240 and then may calculate position coordinates of a nearby object on the basis of the updated intrinsic parameter and extrinsic parameter. According to various embodiments, the processor 260 may perform sensor calibration in a specified period without acquiring the sensor calibration request through the input circuit 230.

The processor 260 may set (or plan) a flight path for sensor calibration of the unmanned aerial vehicle 100 on the basis of the displacement position information and the visible-range information (e.g., viewing angles) of the plurality of sensors 240. For example, the processor 260 may set a flight path including a plurality of waypoints to allow the unmanned aerial vehicle 100 to be positioned within a visible range of at least one of the plurality of sensors 240. As another example, the processor 260 may determine the plurality of waypoints to include all regions in which the visible ranges of two of the plurality of sensors 240 overlap each other.

The processor 260 may determine waypoints of the flight path to cover the perimeter of the autonomous vehicle. For example, the processor 260 may determine, as a plurality of waypoints, intersections between a curve spaced a specific distance from the autonomous vehicle to surround the autonomous vehicle and points obtained by dividing the circumference of the autonomous vehicle by first unit angles.

The processor 260 may determine the posture angle of the unmanned aerial vehicle 100 so that the autonomous vehicle and the checkerboard 100a fixed to the unmanned aerial vehicle 100 form a plurality of angles among a first critical angle (e.g., about −180 degrees) to a second critical angle (e.g., about +180 degrees) at the waypoints. For example, the processor 260 may determine, as the posture angle of the unmanned aerial vehicle 100, a plurality of angles that are formed between the checkerboard 100a and a horizontal line between the left and right of the autonomous vehicle and that range from the first critical angle (e.g., about −180 degrees) to the second critical angle (e.g., about +180 degrees). The processor 260 may associate the determined posture angles with the waypoints of the flight path.

When the unmanned aerial vehicle 100 is stopped, the processor 260 may transmit a flight start command to the unmanned aerial vehicle 100 and detect the position coordinates of the unmanned aerial vehicle 100 through the plurality of sensors 240. In this regard, the processor 260 may check the operating state of the unmanned aerial vehicle 100 in communication with the unmanned aerial vehicle 100 through the communication circuit 210 and determine whether the unmanned aerial vehicle 100 is stopped.

By transmitting a flight position change command to the unmanned aerial vehicle 100, the processor 260 may control a relative position of the unmanned aerial vehicle 100 and determine whether the unmanned aerial vehicle 100 reaches each waypoint corresponding to the predetermined flight path. For example, the processor 260 may determine whether the unmanned aerial vehicle 100 arrives at each waypoint on the basis of the position coordinates of the unmanned aerial vehicle 100 acquired from the plurality of sensors 240.

When the unmanned aerial vehicle 100 reaches a first waypoint among the plurality of waypoints, the processor 260 may transmit a flight state holding command to the unmanned aerial vehicle 100. When it is determined the unmanned aerial vehicle 100 is hovering, the processor 260 may detect the checkerboard 100a fixed to the unmanned aerial vehicle 100 through the plurality of sensors 240 at the same time. In this case, the processor 260 may generate a plurality of images. Also, the processor 260 may generate a plurality of images corresponding to the first waypoint and the plurality of posture angles while changing the posture angle of the unmanned aerial vehicle 100 at the first waypoint to the plurality of posture angles corresponding to the predetermined flight path.

The processor 260 may transmit a flight state change command to move the unmanned aerial vehicle 100 from the first waypoint to a second waypoint and then may allow the unmanned aerial vehicle 100 to hover at the second waypoint. When it is determined the unmanned aerial vehicle 100 is hovering at the second waypoint, the processor 260 may detect the checkerboard 100a fixed to the unmanned aerial vehicle 100 through the plurality of sensors 240 at the same time. In this case, the processor 260 may generate a plurality of images. Also, the processor 260 may generate a plurality of images corresponding to the second waypoint and the plurality of posture angles through the plurality of sensors 240 while changing the posture angle of the unmanned aerial vehicle 100 to the plurality of posture angles corresponding to the predetermined flight path.

Through the above-described process, the processor 260 may generate a plurality of images corresponding to the plurality of posture angles for all the waypoints included in the predetermined flight path. The processor 260 may extract matching points from a plurality of images corresponding to a plurality of waypoints and a plurality of posture angles and may determine an intrinsic parameter and an extrinsic parameter of each of the plurality of sensors 240 on the basis of a relationship between the extracted matching points. The processor 260 may update the intrinsic parameter and the extrinsic parameter of each sensor 240 stored in the memory 250 and then may convert position coordinates detected by the sensors 240 on the basis of the updated intrinsic parameter and extrinsic parameter into the reference coordinate system.

According to various embodiments, when a flight path is initially set once on the basis of placement positions and visible ranges of the plurality of sensors 240, the processor 260 may store the set flight path in the memory 250 and then may use the stored flight path for subsequent sensor calibration. According to various embodiments, when an intrinsic parameter and an extrinsic parameter are updated, the processor 260 may update the flight path stored in the memory 250 on the basis of the updated intrinsic parameter and the extrinsic parameter and then may use the updated flight path for subsequent sensor calibration.

According to various embodiments, the processor 260 may check whether the unmanned aerial vehicle 100 has reached each waypoint on the basis of the flight state reporting information received from the unmanned aerial vehicle 100. Alternatively, the processor 260 may check whether the unmanned aerial vehicle 100 has reached each waypoint on the basis of the flight state reporting information and the position coordinates of the unmanned aerial vehicle 100.

According to various embodiments, the autonomous vehicle may fix or house the unmanned aerial vehicle 100 in a region (e.g., inside a trunk). For example, for the purpose of sensor calibration, the autonomous driving device 200 may close the trunk after flying the unmanned aerial vehicle 100 housed in the trunk and may perform the above-described operations for sensor calibration. Subsequently, after the sensor calibration, the autonomous driving device 200 may house the unmanned aerial vehicle 100 in the trunk again.

According to the above-described embodiment, the autonomous driving device 200 may use the unmanned aerial vehicle 100 to easily and accurately determine the position and angle of the checkerboard 100a based on a vehicle body, and thus it is possible to significantly improve calibration convenience of a vehicle sensor.

Also, according to the above-described embodiment, the autonomous driving device 200 may perform vehicle sensor calibration using the unmanned aerial vehicle 100 fixed to the checkerboard 100a, and thus it is possible to eliminate conventional inconvenience in which vehicle calibration has to be performed only in a specific space formed for calibration.

Figure 6:
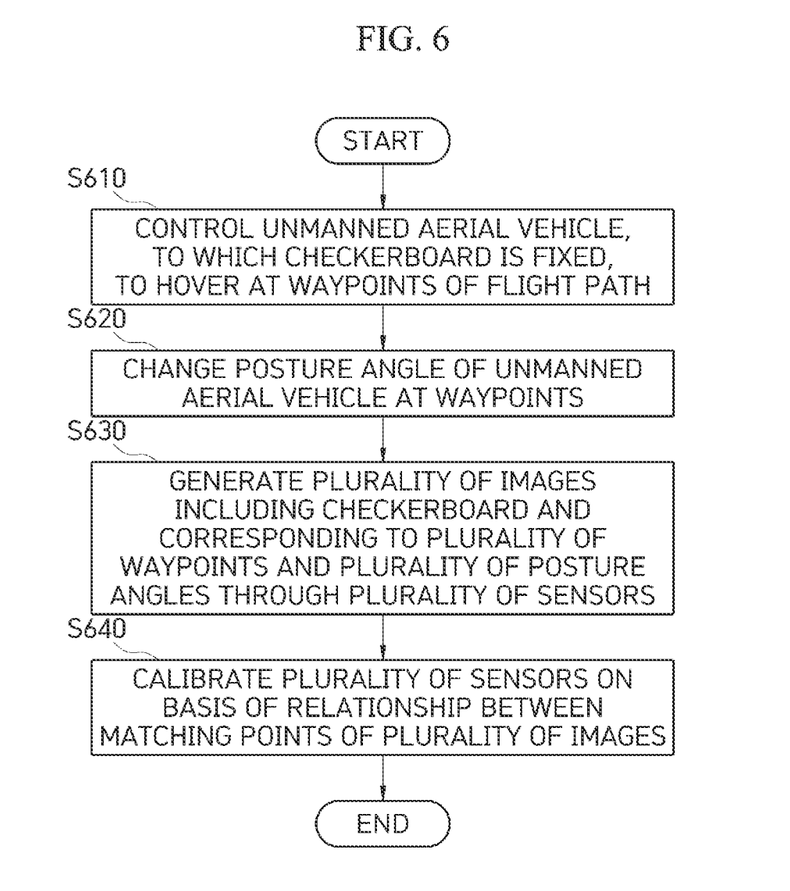
FIG. 6 shows a sensor calibration method according to an embodiment.

FIG. 6 shows a sensor calibration method according to an embodiment.

Referring to FIG. 6, in operation 610, an autonomous driving device 200 may control an unmanned aerial vehicle 100 to which a checkerboard 100a is fixed so that the unmanned aerial vehicle 100 hovers at a plurality of waypoints of a designated flight path.

In operation 620, the autonomous driving device 200 may change the posture angle of the unmanned aerial vehicle 100 at the waypoints to a plurality of posture angles corresponding to the flight path.

In operation 630, the autonomous driving device 200 may generate a plurality of images including the checkerboard 100a and corresponding to the plurality of waypoints and the plurality of posture angles through a plurality of sensors 240.

In operation 640, the autonomous driving device 200 may calibrate the plurality of sensors on the basis of a relationship between matching points of the plurality of images. For example, the autonomous driving device 200 may extract matching points from the plurality of images corresponding to the plurality of waypoints and the plurality of posture angles and may determine an intrinsic parameter and an extrinsic parameter of each of the plurality of sensors 240 on the basis of a relationship between the extracted matching points. Subsequently, the autonomous driving device 200 may convert position coordinates detected by each of the sensors 240 on the basis of the determined intrinsic parameter and extrinsic parameter into a reference coordinate system and may determine position coordinates of a nearby object through the plurality of sensors 240 on the basis of the reference coordinate system.

The various embodiments and the terms used herein are not intended to limit the technical features disclosed herein to specific embodiments and should be understood to include various modifications, equivalents, or alternatives of the corresponding embodiments. In describing the drawings, similar reference numerals may be used to designate similar or relevant constituent elements. The singular form of a noun corresponding to an item may include one or more items unless the context clearly indicates otherwise. Herein, phrases such as "A or B," "at least one of A and B," "at least one of A or B," "A, B, or C," "at least one of A, B, and C," and "at least one of A, B, or C" may include any one or all possible combinations of items listed in the phrases. Terms such as "first" and "second" may simply be used to distinguish corresponding elements from the other elements, and the corresponding elements are not limited in other respects (e.g., importance or order). When a certain (e.g., first) element is referred to as being "coupled" or "connected" to another (e.g., second) element, with or without a term "functionally" or "communicatively," it means that the certain element can be connected to the other element directly (e.g., by wire), wirelessly, or via a third element.

The term "module" used herein may include a unit implemented in hardware, software, or firmware and may be used interchangeably with, for example, terms such as logic, logic block, component, or circuit. The "module" may be an integrated component, a minimum unit for performing one or more functions, or a part thereof. For example, according to an embodiment, the "module" may be implemented in the form of an application-specific integrated circuit (ASIC).

Various embodiments disclosed herein may be implemented by software (e.g., a program) including one or more instructions stored in a storage medium (e.g., an internal memory or an external memory; the memory 250) readable by a machine (e.g., the autonomous driving device 200). For example, a processor (e.g., the processor 260) of the machine (e.g., the autonomous driving device 200) may call and execute at least one of the one or more instructions stored in the storage medium. This allows the machine to be operated to perform at least one function in accordance with the at least one called instruction. The one or more instructions may include code generated by a compiler or code executable by an interpreter. The machine-readable storage medium may be provided in the form of a non-transitory storage medium. Here, the term "non-transitory" merely denotes that the storage medium is tangible and does not include a signal (e.g., electromagnetic waves), irrespective of whether data is semi-permanently or temporarily stored in the storage medium.

According to an embodiment, the method according to various embodiments disclosed herein may be included and provided in a computer program product. The computer program product may be traded between a seller and a purchaser as a commodity. The computer program product may be distributed in the form of a machine-readable storage medium (e.g., compact disc read-only memory (CD-ROM)) or may be distributed (e.g., downloaded or uploaded) via an application store (e.g., PlayStore™), directly between two user devices (e.g., smartphones) or online. For online distribution, at least a portion of the computer program product may be at least provisionally generated or temporarily stored in a machine-readable storage medium such as a memory of a manufacturer's server, an application store's server, or a relay server.

According to various embodiments disclosed herein, it is possible to easily calibrate sensors of an autonomous vehicle. In addition, it is possible to provide various advantageous effects that are directly or indirectly obtained through this document.

According to various embodiments, each of the above-described elements (e.g., modules or programs) may include one or more entities. According to various embodiments, one or more of the above-described elements or operations may be omitted, or one or more other elements or operations may be added. Alternatively or additionally, a plurality of elements (e.g., modules or programs) may be integrated into one element. In such a case, the integrated element may perform one or more functions of each of the plurality of elements in the same or a similar manner as being performed by the corresponding one among the plurality of elements prior to the integration. According to various embodiments, operations performed by a module, a program, or other elements may be executed sequentially, in parallel, repeatedly, or heuristically. One or more of the operations may be omitted or executed in different orders. Alternatively, one or more other operations may be added.

What is claimed is:

1. An autonomous driving device included in an autonomous vehicle, the autonomous driving device comprising:
 a communication circuit configured to communicate with an unmanned aerial vehicle to which a checkerboard is fixed;
 a plurality of sensors disposed in the autonomous vehicle to monitor all directions of the autonomous vehicle; and
 a processor,
 wherein the processor is configured to:
  control the unmanned aerial vehicle to hover at each of a plurality of waypoints of a designated flight path by controlling a relative position of the unmanned aerial vehicle through the communication circuit;

change a posture angle of the unmanned aerial vehicle to a plurality of posture angles corresponding to the waypoints of the flight path;

generate a plurality of images including the checkerboard and corresponding to the plurality of waypoints and the plurality of posture angles through the plurality of sensors; and calibrate the plurality of sensors on the basis of a relationship between matching points of the plurality of images.

2. The autonomous driving device of claim 1, wherein the processor designates the flight path including the plurality of waypoints so that the unmanned aerial vehicle is positioned in a visible range of at least one of the plurality of sensors.

3. The autonomous driving device of claim 2, wherein the processor designates the plurality of waypoints to include all regions in which visible ranges of two of the plurality of sensors overlap each other.

4. The autonomous driving device of claim 2, wherein the processor designates, as the plurality of waypoints, intersections between a line spaced a specific distance from the autonomous vehicle and points obtained by dividing a circumference of the autonomous vehicle by first unit angles.

5. The autonomous driving device of claim 2, wherein the processor is configured to:
designate the plurality of posture angles related to the waypoints so that the checkerboard and the autonomous vehicle form a plurality of angles ranging from a first critical angle to a second critical angle at the waypoints; and
associate the designated posture angles with the waypoints of the flight path.

6. The autonomous driving device of claim 2, wherein
the processor stores the designated flight path in a memory when the flight path is designated, and
the processor uses the designated flight path during subsequent calibration of the plurality of sensors.

7. The autonomous driving device of claim 1, wherein the processor updates the flight path on the basis of a result of the calibration of the plurality of sensors.

8. The autonomous driving device of claim 1, wherein the processor is configured to:
determine an intrinsic parameter and an extrinsic parameter during the calibration of the plurality of sensors; and
determine position coordinates of a nearby object on the basis of the determined intrinsic parameter and the extrinsic parameter when the nearby object is detected through the plurality of sensors.

9. A sensor calibration system comprising:
an unmanned aerial vehicle to which a checkerboard is fixed; and
an autonomous driving device configured to control the unmanned aerial vehicle and included in an autonomous vehicle,
wherein the autonomous driving device is configured to:
control the unmanned aerial vehicle to hover at each of a plurality of waypoints of a designated flight path by controlling a relative position of the unmanned aerial vehicle;
change a posture angle of the unmanned aerial vehicle to a plurality of posture angles corresponding to the waypoints of the flight path;

generate a plurality of images including the checkerboard and corresponding to the plurality of waypoints and the plurality of posture angles through a plurality of sensors; and calibrate the plurality of sensors on the basis of a relationship between matching points of the plurality of images.

10. The sensor calibration system of claim 9, wherein
the unmanned aerial vehicle is fixed or housed in a region of the autonomous vehicle, and
the unmanned aerial vehicle is configured to start flight corresponding to the flight path according to a command of the autonomous driving device.

11. The sensor calibration system of claim 9, wherein
the unmanned aerial vehicle changes a flight state, which is at least one of a flight position or a posture angle, according to a command received from the autonomous driving device, and
the unmanned aerial vehicle transmits flight state reporting information corresponding to a change of the at least one flight state to the autonomous driving device.

12. The sensor calibration system of claim 9, wherein
the unmanned aerial vehicle comprises a Global Positioning System (GPS) module configured to detect current position coordinates of the unmanned aerial vehicle, and
the unmanned aerial vehicle controls a flight position according to a command received from the autonomous vehicle on the basis of the detected current position coordinates.

13. The sensor calibration system of claim 9, wherein the autonomous driving device is configured to:
designate the flight path including the plurality of waypoints so that the unmanned aerial vehicle is positioned in a visible range of at least one of the plurality of sensors; and
control a flight position of the unmanned aerial vehicle according to the designated flight path.

14. The sensor calibration system of claim 9, wherein the autonomous driving vehicle is configured to:
designate the plurality of posture angles related to the waypoints so that the checkerboard and the autonomous vehicle form a plurality of angles ranging from a first critical angle to a second critical angle at the waypoints, associate the designated posture angles with the waypoints of the flight path; and
control a posture angle of the unmanned aerial vehicle to be the plurality of posture angles at the waypoints.

15. A sensor calibration method performed by an autonomous driving device, the sensor calibration method comprising:
controlling an unmanned aerial vehicle, to which a checkerboard is fixed, to hover at each of a plurality of waypoints of a designated flight path;
changing a posture angle of the unmanned aerial vehicle to a plurality of posture angles corresponding to the waypoints of the flight path;
generating a plurality of images including the checkerboard and corresponding to the plurality of waypoints and the plurality of posture angles through a plurality of sensors included in the autonomous driving device; and
calibrating the plurality of sensors on the basis of a relationship between matching points of the plurality of images.

16. The sensor calibration method of claim 15, further comprising designating the flight path including the plurality of waypoints so that the unmanned aerial vehicle is positioned in a visible range of at least one of the plurality of sensors.

17. The sensor calibration method of claim 16, where the designating of the flight path comprises designating the plurality of waypoints to include all regions in which visible ranges of two of the plurality of sensors overlap each other.

18. The sensor calibration method of claim 16, wherein the designating of the flight path comprises designating, as the plurality of waypoints, intersections between a curve spaced a specific distance from an autonomous vehicle and points obtained by dividing a circumference of the autonomous vehicle by first unit angles.

19. The sensor calibration method of claim 16, wherein the designating of the flight path comprises designating the plurality of posture angles related to the waypoints so that the checkerboard and an autonomous vehicle form a plurality of angles ranging from a first critical angle to a second critical angle at the waypoints.

20. The autonomous driving device of claim 15, further comprising updating the flight path on the basis of a result of the calibration of the plurality of sensors.

* * * * *